3,364,261
PREPARATION OF CYCLOHEXYLAMINE FROM PHENOL

Frederik H. Van Munster, Waukegan, Ill., assignor to Abbott Laboratories, Chicago, Ill., a corporation of Illinois
No Drawing. Filed Apr. 13, 1964, Ser. No. 359,821
4 Claims. (Cl. 260—563)

ABSTRACT OF THE DISCLOSURE

Cyclohexylamine is made from phenol, ammonia, and hydrogen at low pressure and in the liquid phase using rhodium as the hydrogenation catalyst. The process produces substantially no secondary amines.

---

The present invention is concerned with the manufacture of cyclohexylamine. More particularly, it is concerned with an economical process for making cyclohexylamine from phenol.

It has been known from the prior art that cyclohexylamine can be obtained by hydrogenating phenol in the presence of ammonia and a large amount of Raney nickel catalyst. This process, however, has the serious disadvantages of requiring large amounts of non-reuseable catalyst, producing low yields, and requiring high pressures and high temperatures for the reaction.

It is therefore an object of the present invention to provide a method for the manufacture of cyclohexylamine which (a) operates under mild conditions, (b) uses low catalyst ratios, (c) produces high yields of cyclohexylamine and (d) produces only insignificant amounts of dicyclohexylamine which is difficult to eliminate from the reaction product.

These and other objects are accomplished by subjecting phenol to gaseous hydrogen and ammonia at a pressure above atmospheric pressure and at a temperature between 70° and 150° C. in the presence of at least 0.02% of catalytic metallic rhodium by weight based on the amount of phenol, and by using a substantially equimolar ratio of phenol and ammonia.

The new process is preferably carried out at a pressure between 15 and 150 p.s.i.g. and in the presence of between 0.02% and 5% of the metallic rhodium by weight based on the amount of phenol. The process can be carried out in the presence or absence of water. The fact that water may be present in the present reaction is of great convenience since the necessary amount of ammonia can be added in the form of a relatively concentrated aqueous ammonia solution. When operating in the absence of water, ammonia gas is preferably mixed with hydrogen gas in a substantially molar ratio, e.g. 1:3 moles, whereby the amounts of the respective gases are also used in a proportion equimolar to the phenol to be hydrogenated.

It will be appreciated by those skilled in the art that larger amounts of the catalyst than the upper limit mentioned above may be used but no advantage is seen in using more than the above mentioned 5%. The temperature limits for the present process enable the manufacturer to operate in the liquid phase since the phenol and the formed cyclohexylamine are both liquids under the above recited temperature and pressure conditions.

A particular advantage of the present process is the fact that it can be carried out in so-called low-pressure equipment such as a still, a Parr shaker, or the like, since excellent results can be obtained when employing pressures between atmospheric pressure and about 60 p.s.i.g. Of course, higher pressures may be employed where the equipment to be used will withstand such conditions but no process advantage is attained when increasing these pressures above about 150 p.s.i.g.

Another and very surprising advantage of the present process is the high yield of cyclohexylamine obtained, or the low amounts of by-products such as N-phenylcyclohexylamine, dicyclohexylamine, cyclohexanol and cyclohexanone formed. This is due to the use of the particular catalyst used according to the present invention which appears to be very specific in favoring the formation of cyclohexylamine. The metallic rhodium catalyst used in the present process can be employed in any of its known catalytic forms such as in the form of small metal particles or metallic sponge, or the rhodium can be supported by the usual carriers such as charcoal, alumina and the like. The physical shape of the supported catalyst may be in any of the many conventional forms such as pellets, rods, chunks or finely divided particles.

The present invention is better understood by reference to the following examples which are added merely as illustration and which are not meant to limit the invention in any way.

EXAMPLE 1

In a Parr shaker glass bottle, 47.1 grams of phenol and 40 ml. of 28% aqueous ammonia solution are mixed and 1.9 grams of 2.5% rhodium on alumina (0.1% rhodium by weight based on phenol) are added. After purging the air with hydrogen gas, the bottle is pressurized to 60 p.s.i.g. hydrogen pressure. The reaction mixture is then heated to 80–100° C., which temperature is maintained while the hydrogen pressure is allowed to decrease to about 30 p.s.i.g. before it is increased again to 60 p.s.i.g. by introducing additional amounts of hydrogen gas. After about 23 hours of keeping the hydrogen pressure between 30 and 60 p.s.i.g., the reaction is interrupted and the catalyst is filtered off. The filtrate is dried over sodium hydroxide pellets and the top layer is distilled. The main fraction boiling at 134–136° C. and atmospheric pressure is the desired cyclohexylamine which is obtained in a yield of 65% of theory or 32.1 grams. Gas chromatographic analysis shows a purity of 99%.

EXAMPLE 2

In a repetition of Example 1, using the same parameters but 3.8 grams of 2.5% rhodium on alumina (0.2% by weight based on phenol), 35.2 grams of cyclohexylamine of a purity of 95% is obtained, which represents a yield of 67.5% of theory. Duration of reaction: 7 hours.

EXAMPLE 3

In a further repetition of Example 1, the amount of catalyst is raised to 10 grams of 5% rhodium on alumina (1.07% rhodium by weight of phenol). The reaction is completed in 6 hours, producing 42.3 grams of cyclohexylamine (or 81.9% of theory) with a purity of 96%.

EXAMPLE 4

A 500-ml. Parr shaker is charged with 23.6 grams of phenol and 2 grams of 5% rhodium (0.4% metallic rhodium by weight of phenol) on carbon. After the necessary purging of the vessel with hydrogen, the pressure is brought from vacuum to 60 p.s.i.g. with a mixture of hydrogen and ammonia gas in a ratio of 3:2. Heat is supplied to keep the temperature in the shaking flask at 90°±5° C. The pressure is kept between 40 and 60 p.s.i.g. and the amination/hydrogenation reaction of followed by the drop of the pressure in the shaker flask. After about half of the calculated gas mixture is consumed, the above $H_2/NH_3$ mixture is replaced by pure hydrogen gas and the reaction is continued until 86% of the theoretical quantity of hydrogen is absorbed. The product mixture is filtered and the clear one-phase liquid filtrate is analyzed by gas chromatography to show 80.1% cyclohexylamine, 2.2% cyclohexanol, 0.3% dicyclohexylamine, 0.1% N-phenylcyclohexylamine, and 17.1% phenol. Based on the amount of starting material used, the yield of cyclohexylamine is actually 96.6% of theory.

EXAMPLE 5

A Parr shaker containing 41.1 grams of phenol and 4 grams of 2.5% rhodium on alumina (0.215% rhodium metal) is connected to a gas line which delivers a mixture of hydrogen and ammonia gas in a molar ratio of 3:1. After purging the Parr shaker with this gas, the amination/hydrogenation reaction is started by keeping the temperature between 90° and 100° C. and the gas pressure between 28 and 63 p.s.i.g. After 7.25 hours, the reaction is terminated by cooling the mixture to room temperature and stopping the agitation. The mixture is filtered to remove the catalyst and the clear, colorless filtrate which represents a single liquid phase is analyzed by gas chromatography, showing 95.0% cyclohexylamine, 0.6% low-boiling components, 2.7% cyclohexanol or cyclohexanone, and 1.8% dicyclohexylamine.

The catalyst is first washed with water, then with 10% acetic acid, and then again with water. The thus recovered catalyst is then dried at 100° C. and reused in an experiment identical to the one above. The resulting filtrate, after the amination/hydrogenation reaction and filtration, shows the following composition: 86.9% cyclohexylamine, 0.8% low-boiling components, 1.8% cyclohexanol or cyclohexanone, 0.2% dicyclohexylamine, and 10.3% unreacted phenol. By allowing for the unreacted phenol, the actual yield of cyclohexylamine is 96.8%.

Others may practice the invention in any of the numerous ways which will be obvious to one skilled in the art by the present disclosure. All such practice of the invention is considered a part hereof provided it falls within the scope of the appended claims.

I claim:
1. The process of manufacturing cyclohexylamine consisting essentially of the step of reacting phenol in the liquid phase with ammonia and hydrogen at a pressure between 15 and 150 p.s.i.g. and at a temperature between 70° and 150° C. in the presence of at least 0.02% of catalytic metallic rhodium by weight based on the amount of phenol, whereby said phenol, ammonia and hydrogen are introduced into the reaction zone substantially at a molar ratio of 1:1:3.
2. The process of claim 1 wherein said ammonia is introduced as an aqueous solution.
3. The process of claim 1 wherein said hydrogen and said ammonia are pre-mixed as gases in a ratio of substantially 3:1.
4. The process of claim 1 wherein said amount of rhodium is between 0.02% and 2.0% by weight based on the amount of phenol.

References Cited

UNITED STATES PATENTS

| 1,982,985 | 12/1934 | Ernst et al. | 260—563 |
| 3,117,992 | 1/1964 | Duggan | 260—563 |

FOREIGN PATENTS 881,512  11/1961  Great Britain.

OTHER REFERENCES

Unit Process in Organic Synthesis, Groggins, fifth ed., 1958, page 578.

CHARLES B. PARKER, *Primary Examiner.*

N. WICZER, *Assistant Examiner.*